Jan. 14, 1936.  H. H. LINN  2,027,989
DUMP BODY FOR VEHICLES
Filed Sept. 30, 1931  2 Sheets-Sheet 1
Fig. 1.
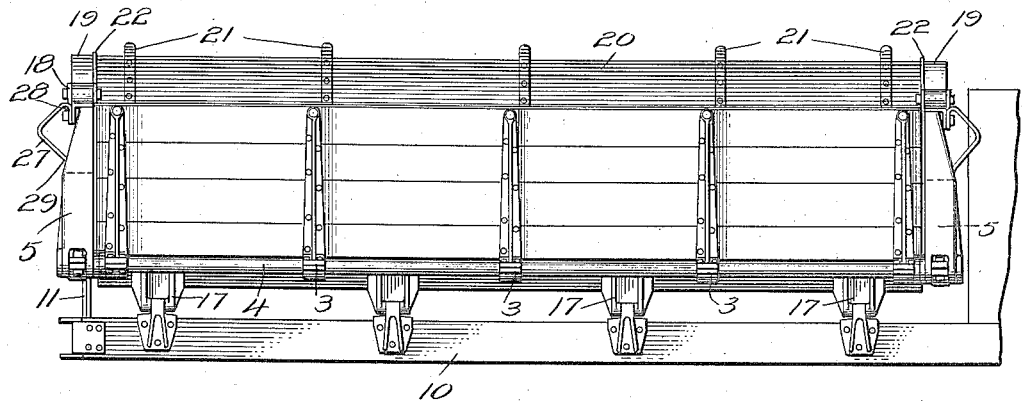
Fig. 2.
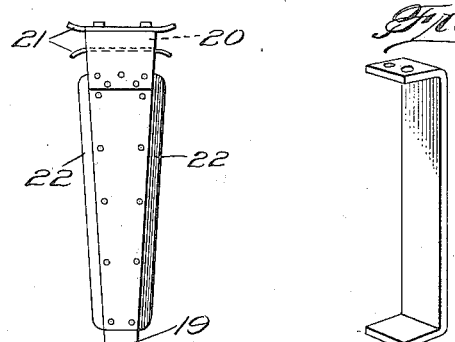
Fig. 4.
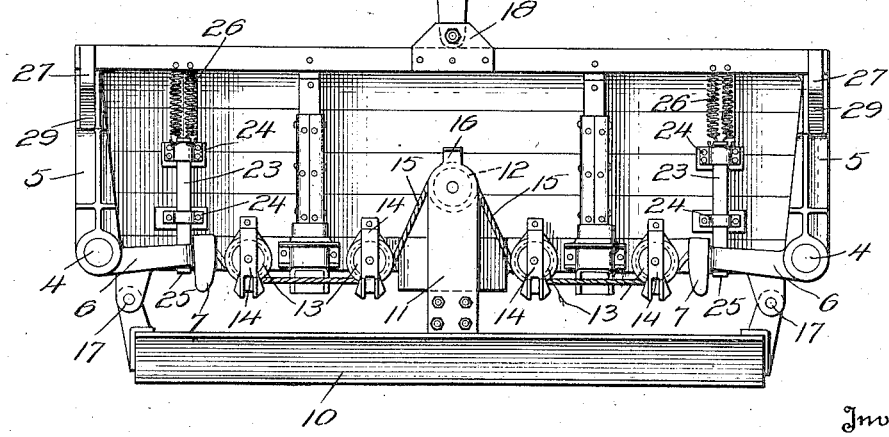
Inventor
H. H. Linn.
By Jas. T. Richmond
Attorney Jan. 14, 1936.    H. H. LINN    2,027,989
DUMP BODY FOR VEHICLES
Filed Sept. 30, 1931    2 Sheets-Sheet 2
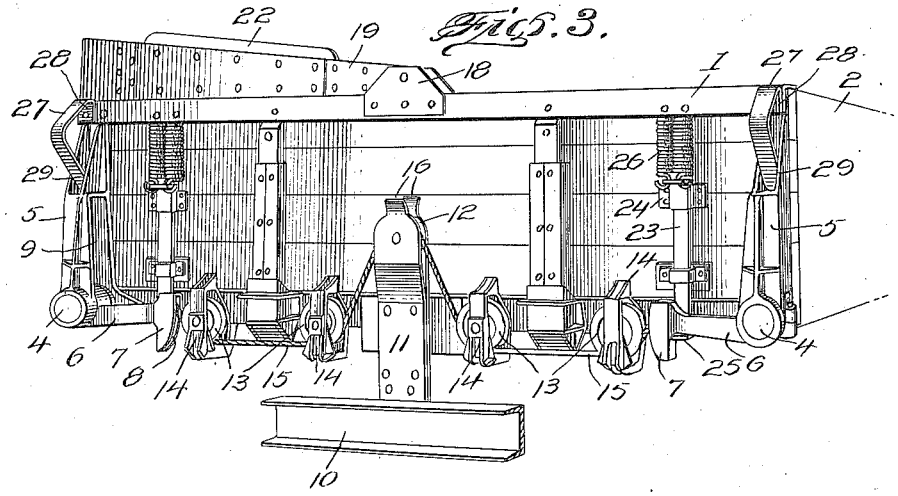
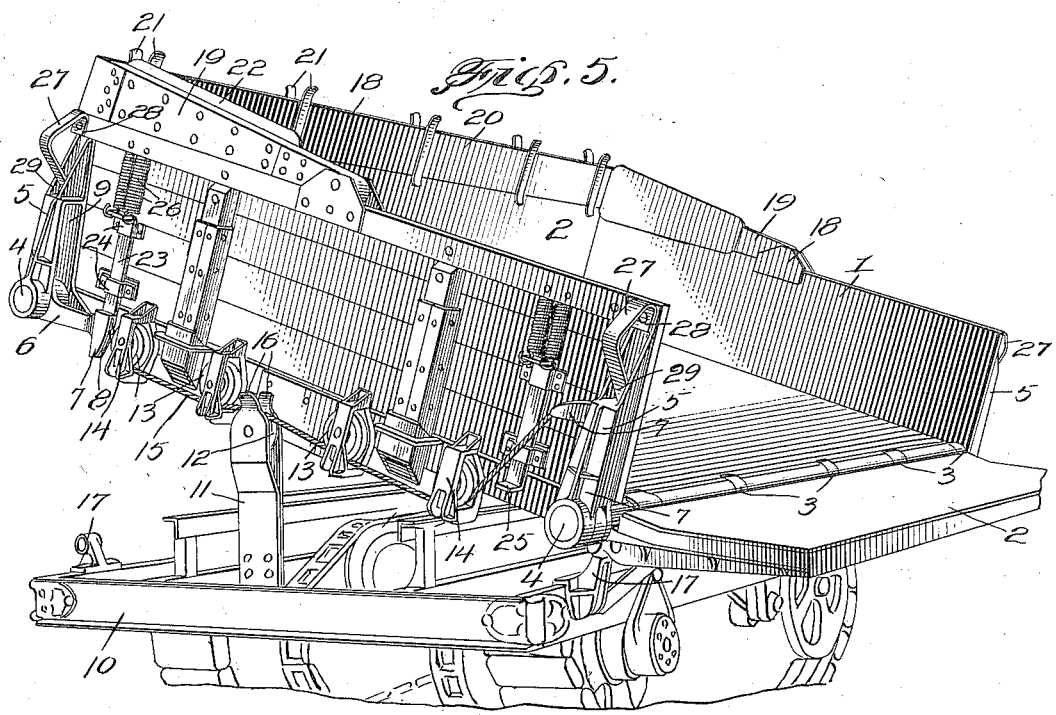
Inventor
H. H. Linn.
By Jack Richmond
Attorney Patented Jan. 14, 1936

2,027,989

UNITED STATES PATENT OFFICE 2,027,989

DUMP BODY FOR VEHICLES

Holman Harry Linn, Morris, N. Y., assignor to The Linn Manufacturing Corporation, Morris, N. Y., a corporation of New York Application September 30, 1931, Serial No. 566,114

2 Claims. (Cl. 298—23)

The invention relates to vehicle dump bodies and particularly dump bodies having delivery sections or gates operable to open automatically in the movement of the dump body to dumping position and to close automatically upon the return of the dump body to normal or non-dumping position; and comprehends certain improvements on the subject matter of my application of December 10, 1930, Serial No. 501,451.

One of the objects is to provide means capable of cooperation with either side of the vehicle to the end of promoting additional loading capacity.

A further object is the provision of a spring catch which serves yieldingly to receive the arms connected to the movable side closure of the dump body to cushion the parts in their return to normal position and to assist in the initial opening movement of the respective side gate.

A further object is the provision of a guard connected to the dump body to serve as a means for lifting the lower side of the belt of an elevating grader over the corner of the end of the body, while still allowing for an absolutely straight contour without any projections throughout the length of the side of the body.

Other objects as well as the nature, characteristic features and scope of the invention more readily will be understood from the following description, taken in connection with the accompanying drawings, wherein—

Figure 1 represents one of the sides in side elevation, illustrating sufficient of the dump body and chassis to show the application of the improved control means.

Figure 2 is an end elevation, the rim board being shown in elevated position and capable of cooperation with either side gate.

Figure 3 is a perspective view of the end gate or tail board.

Figure 4 is a detail view of the spring catch.

Figure 5 is a perspective view of the dump body in dumping position, the rim board being shown in position to cooperate with one of the sides.

In the prior application above referred to, the means for the selective operation of the dump body and its gates is substantially as in the present application, and in order properly to understand the improvements to which the present invention is addressed, a brief description of the features of the previous application will be given.

The tiltable dump body 1 is provided with side gates 2, either of which may be moved into substantially co-planar relation with the bottom of the dump body in order to provide for the discharge of the load. Gates 2 are secured by mountings 3 to shafts 4. The latter are mounted in bracket bearings 5 secured to the ends of the dump body and providing end supports for the swinging movement of the latter.

Shaft 4 is provided at its ends with arms 6 rigid with the shaft and overlying the ends of the dump body, the arms having elongated heads 7 formed with channels 8 for the reception of the operating cable, hereinafter referred to. Brackets 5 have inwardly directed vertical channels 9 of a size snugly to receive the arms when the latter are turned up, that is, when the side member to which the particular arms are connected is in dumping position. The bottoms of the channels 9 serve as stops to limit the position of the arm in the dumping movement of the side, thus providing a rigid support for the side when in dumping position and avoiding strain on the operating cables under the movement of the load over the lowered side. Midway of the end support 10 of the chassis is a standard 11 carrying a sheave 12. Secured on the ends of the dump body on each side of standard 11 are sheaves 13 mounted in appropriate brackets 14.

A cable 15 passes over sheave 12 and under sheaves 13 and has its ends secured to the arms 6. A guard 16 serves to prevent the displacement of the cable with relation to sheave 12 while the brackets 14 perform the same office with respect to sheaves 13.

The sheaves 13 serve as guides or fairleads for the cable, and while two are shown on each side it is, of course, to be understood that their number may vary and that they may be variously located. The terminals of the cable 15 are secured to heads 7 of the arms 6, and as the arms move from an inoperative position, the cables lie in the channels 8 in the heads to insure a proper pull on the arms in moving the side gates to closed position. The length of the cable 15 is such that when in substantially straight relation, that is, in substantially straight line from one arm to the other, there is sufficient slack in the cable to permit one side gate to move to dumping position, that is, for one arm 6 to move into cooperation with the bracket 5 and thus permit the side to which the arm is connected to assume a plane substantially coincident with that of the bottom of the dump body for the discharge of the load.

The sheave 12 at the upper end of the standard 11 is at such distance above the sheaves 13 that when the dump body is in normal position, that is, resting on the chassis, the slack in the cable is taken up and the arms 6 are drawn to the positions indicated to maintain the side gates closed. In this connection it is preferable that the length of the cable be slightly in excess of that necessary to permit the side gate to move to dumping position when the dump body is raised, while providing, however, that when in inoperative or normal position the pull on the cable will accurately close the side gate. This slight excess of length in the cable permits the side gate to move to dumping position through a raising of the dump body with respect to the sheave 12 and when the arms 6 by cooperation with the brackets 5 hold the dump body in open or dumping position, the slack of the cable prevents any strain on it incident to maintaining the body in this position or of the load passing over the body.

Obviously, from the above, which is substantially an outline of the construction shown in the copending application referred to, the dump body, when moved in either direction about an axis longitudinally of the chassis, automatically will release the lowermost side gate, and on the return of the dump body to normal position the cooperation of the cable with the sheave 12 and the taking up of the slack in the cable as the body returns to normal position will automatically close the gate. The body 1 is supported relatively to the chassis on supports rising therefrom and cooperating with bearing members at the respective corners of the body, said supports and bearing members cooperating to provide hinges 17 on which the dump body is normally supported and on either longitudinal pair of which the dump body may be swung through appropriate lifting mechanism for the dumping operation. If desired, and as preferred, means may be provided for locking the hinged members of the dump body through the supports from the chassis, such means being released for that pair of hinges to be separated in the dumping operation of the dump body.

A feature of the present invention is the adaption of the vehicle to receive a load from a grading machine arranged alongside and having an elevating means, such as a traveling carrier, which controls one side of the dump body for the delivery of the load thereto. As the grading machine is moved during the grading operation, it is to be understood that the load receiver vehicle moves with it so that the load picked up by the grader is continuously delivered to the dump body.

Ordinarily the load is delivered at the side remote from the elevator or material handling device. I depart from that practice and one of the features of the present invention is the provision of means effective with either side and which will temporarily increase the height of that side to provide for receiving a greater load than would be possible with sides of normal height. In achieving this result there are brackets 18 secured centrally fore and aft of the dump body and which serve pivotally to support V arms 19. The arms are of such length that when their heads are joined by the rim board 20, the latter is flush or coextensive with the juxtaposed side gate or closure and effectively increases the height thereof. The rim board is provided with transverse strips with resilient ends 21 which extend beyond both longitudinal edges of the board and constitute double acting clips effective to engage either side gate. The arms 19 are provided on their inner faces with aligning members or plates 22 extending in both directions beyond the upper and lower edges of the arms which bear against the inner edges of the ends of the body accurately to position the arms in alignment with said ends and to insure proper relation of the rim board when in operative position.

Obviously, from the pivotal mounting of the rim board, it may be turned down to cooperate with either side gate and thus extend the height thereof to accommodate an additional load, it being understood that the side gate whose height is so increased is the one remote from the end of the loader of the grading machine and toward which the load is being delivered. As the arms 6 are returned to inoperative position, that is, to the position assumed when the side gates are closed, means are provided for cushioning the arms in this movement and to assist the initial movement of the arms in the opening movement of the particular side gate.

For this purpose, slide bolts 23 mounted in keepers 24 secured to each end of the dump body near the ends are provided at their lower ends with lateral projections 25 which are in position to be engaged by the arms 6 immediately in rear of the heads 7 as the arms move to the inoperative or side gate closing positions. The upper ends of the bolts 23 are connected to the upper ends of the side gates by spring 26, adapted to be tensioned by cooperation of the arms and projections 25 just before the arms reach a normal position. Thus the movement of the arms to normal position is cushioned and the springs, being under tension, assist the movement of the arms toward inoperative position in the initial movement of the dump body to release one of the side gates.

In moving the elevating loader of the grader over the ends of the dump body to position it for loading, there is a tendency for the lower belt of the grader to engage the end of the body and prevent operative relation except under excessive lifting of the loader. To obviate this condition and at the same time provide for an absolutely straight contour throughout the length of the side, guides 27 are secured at the ends of the body in line with the sides. They preferably are secured in extensions of the brackets 5 and constitute comparatively rigid metallic bars having their upper portions 28 inclined rearwardly and downwardly with respect to the ends, with the upper end coincident with the top edge of the body ends. The lower portions 29 of the guides incline from the upper portions downwardly and inwardly into the brackets 5. Thus, if the lower belt of the loader is not in proper position to escape the ends of the body, it will contact with these guides, and particularly the upper portions thereof and be safely guided over the ends of the dump body into contact with the upper edge of the side, which is of course, the desired loading position.

From the foregoing it will be apparent that means are provided for increasing the load capacity of the body at that region of the body to which the load is initially delivered and that said means are capable of cooperation with either side at will; that during the dumping operation of the body the slackening of the cable 15 tends to a release of the pull on the particular arms 6 of the sides of the dump, permitting the arms to swing with the shaft 4 in bearings provided in the brackets 5 until the ends of the arms abut the wall of the bracket to limit the particular side to a dumping position, the initial movement of the arms being materially assisted by the springs 26 and slide bolts 23; and that upon the return of the body to normal position the cable is again tightened by its cooperation with sheave 12 and the gate is returned to closed position by the necessary movement of the arms 6 to the inoperative position shown.

What is claimed as new is:—

1. A dump body having side gates swingingly connected thereto, arms carried by and movable with the side gates, a cable connecting the arms at the smaller ends of opposing side gates, a fixed element cooperating with the cable to move the arms to a predetermined position for the closing of a side gate when the body is returned to normal position and freeing the cable to permit the arms to move with the selected side gate for opening the side gate, and spring-pressed bars underlying and engaged by the arms in their movement to inoperative position, said bars serving to cushion such arm movement and to assist movement of the arms in the opposite direction on slackening of the cable.

2. In a dump body, side gates mounted for relative swinging movement and having arms, means connected with the arms for preselectively operating the gates, and spring-retracted bolts mounted on the dump body and having projections in the path of the arms effective to retard movement of the latter in one direction and to accelerate movement in another direction.

HOLMAN H. LINN.